Nov. 1, 1938.  T. F. PEARSON  2,134,733
SUCTION GATHERER
Original Filed April 17, 1935  5 Sheets-Sheet 1

Inventor
Thomas F. Pearson
By John J. V. Armstrong
Attorneys

Nov. 1, 1938. T. F. PEARSON 2,134,733
SUCTION GATHERER
Original Filed April 17, 1935 5 Sheets-Sheet 3

Nov. 1, 1938. T. F. PEARSON 2,134,733
SUCTION GATHERER
Original Filed April 17, 1935 5 Sheets-Sheet 4

Inventor
Thomas F. Pearson
By: Mason & Porter
Attorneys

Patented Nov. 1, 1938

2,134,733

UNITED STATES PATENT OFFICE 2,134,733

SUCTION GATHERER

Thomas Finney Pearson, Pontefract, England, assignor to Crown Cork & Seal Co. Inc., New York, N. Y., a corporation of New York Application April 17, 1935, Serial No. 16,919. Renewed October 20, 1937. In Great Britain April 23, 1934

7 Claims. (Cl. 49—62)

The present invention relates to improvements in method and apparatus for the feeding of a charge of molten glass to parison moulds or the like receptacles.

According to the present invention a suction operated gathering head is lowered to the surface of glass in a furnace or tank, and then a charge sucked up into the mould of the gathering head, which is of an internal form similar to or a function of the shape of the parison mould or receiving receptacle, whereupon the gathering head or mould is displaced from the furnace or tank to drop into the charge therein, which can therefore, be of a truly predetermined performed shape into a parison mould or receptacle for further operations upon the glass charge, such as the blowing of a bottle, or other hollow glass article.

It will be prefered to mount the gathering head on a swinging arm oscillating about a vertical axis and to dispose the receiving parison mould at the time when the charge is dropped into it, adjacent to the exterior wall of the boot of the furnace, so that the gathering head is displaced by the minimum distance. The angle of swinging therefore, need not exceed 60°.

The invention is more particularly described with reference to the accompanying drawings in which—

Figure 1:
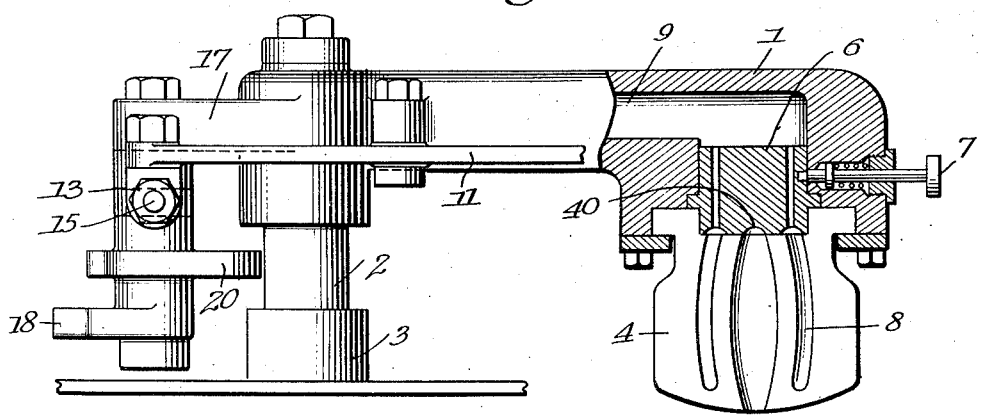
Figure 1 is a side view, partly in section and partly in elevation, of a suction gathering head.
Figure 2:
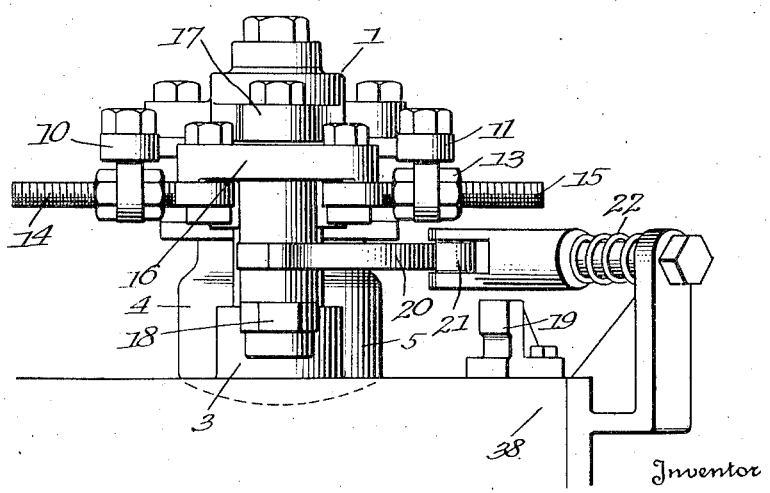
Figure 2 is an end elevation, taken from the left of Figure 1.
Figure 3:
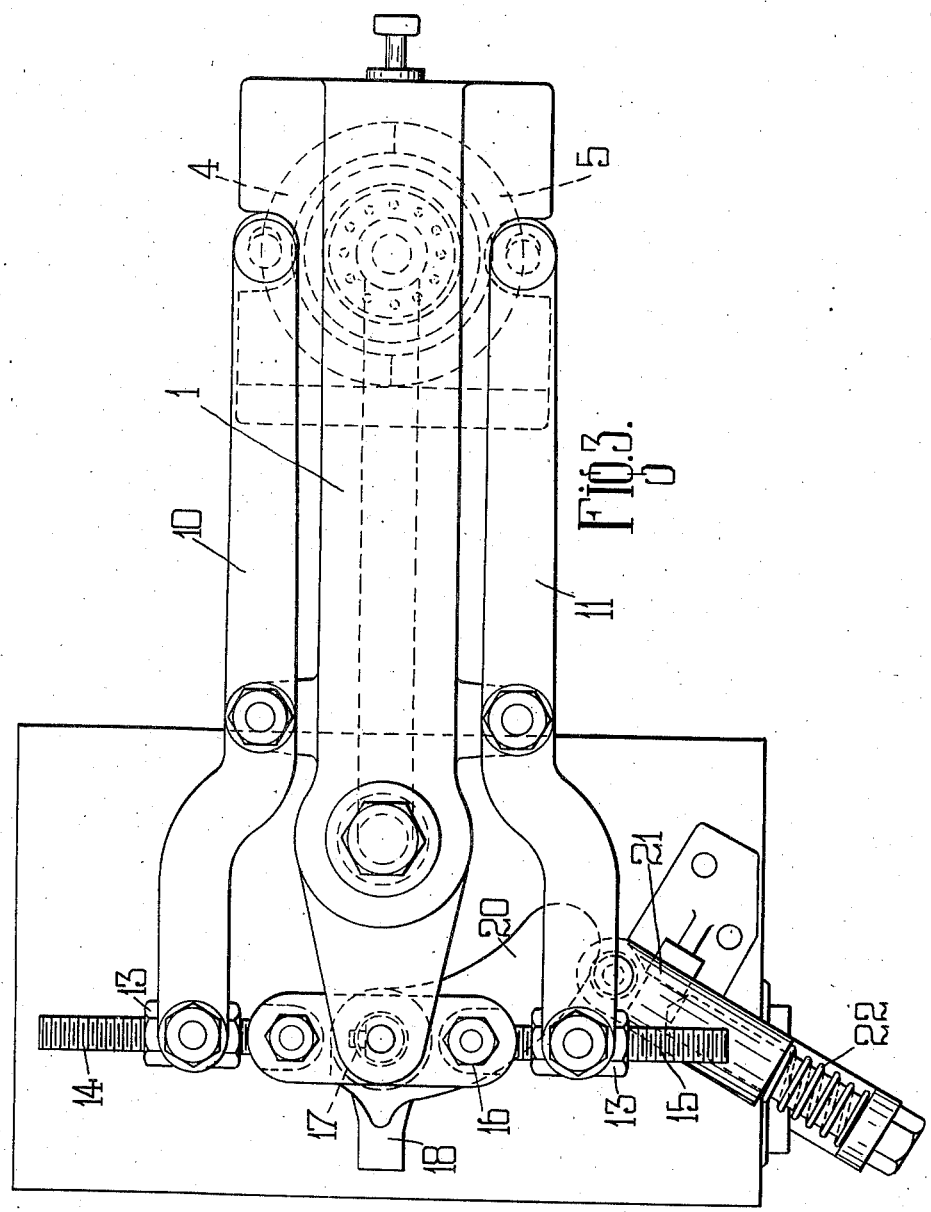
Figure 3 is a plan view of Figure 1.

The gathering head consists of a hollow arm 1 swinging about a hollow vertical spindle 2 telescopically mounted within a bushing 3. This hollow arm carries a tripartite mould consisting of side mould sections 4, 5, and the top mould section 6. These mould sections are detachable and interchangeable, for instance, the mould section 6 can be withdrawn by releasing the spring controlled locking pin 7, so that mould sections of differing internal contour can be substituted to take up a charge which will be of a truly preformed and predetermined shape.

Suction grooves 8 in the mould sections communicate with the hollow passage 9 in the mould arm 1.

The two mould sections 4, 5, are pivotally mounted on the ends of levers 10, 11 pivoted on brackets on the arm 1, and are pivoted at their opposite ends to nuts 12, 13, respectively on threaded spindles 14, 15 pivoted to a yoke 16 keyed to but having a certain degree of lost motion with an extension 17 on the arm 1. This yoke has a lug 18 co-operating with a reciprocating cam 19.

The yoke 16 also has a cam finger 20 engaging a roller 21 on the end of a spring controlled plunger 22.

The spindle 2 supporting the gathering head is adapted to be reciprocated in bearings 23, 24, on a frame 25 secured to the side wall of the furnace, and has collars 26, 27 upon it connected by a rod 28 having a pin 29 engaging with a groove 30 in a face cam 31 mounted about a shaft 32 carrying a sprocket wheel 33 driven by a chain from a second sprocket wheel 34 continuously rotated from any source of power.

A second collar 35 on the spindle 2 has a roller 36 engaging with the edge face 37 of the cam 31. As the connecting rod 28 is offset as shown in Figure 5, it will be obvious that as the groove 30 in the face cam 31 rotates, the shaft 2 will be swung about an angle usually about 60° from the position shown in Figure 4 in which the gathering head at the end of the arm lies above the boot end 38 of the furnace from the line A, A, Figure 6, where it lies in a position to pick up a charge from the furnace to the line A, B, Figure 6, where it lies in a position to drop its charge into a parison mould, which will be automatically brought up by mechanism, not shown, to lie substantially with its centre at the point B. As this point is reached the angularity of the yoke 16 will then be such that the finger 20 upon it will just snap past the roller 21 to swing the arms 10 and 11 about their pivots on the arm 1, and so withdraw the two half moulds 4, 5, from one another leaving a preformed charge, accurately centered upon the centre stationary mould section 6, which preferably has a recess 40 in it, for this centering purpose which will have the effect of preventing the gathered charge from tending to move either with the mould section 4 or the mould section 5.

Figure 4:
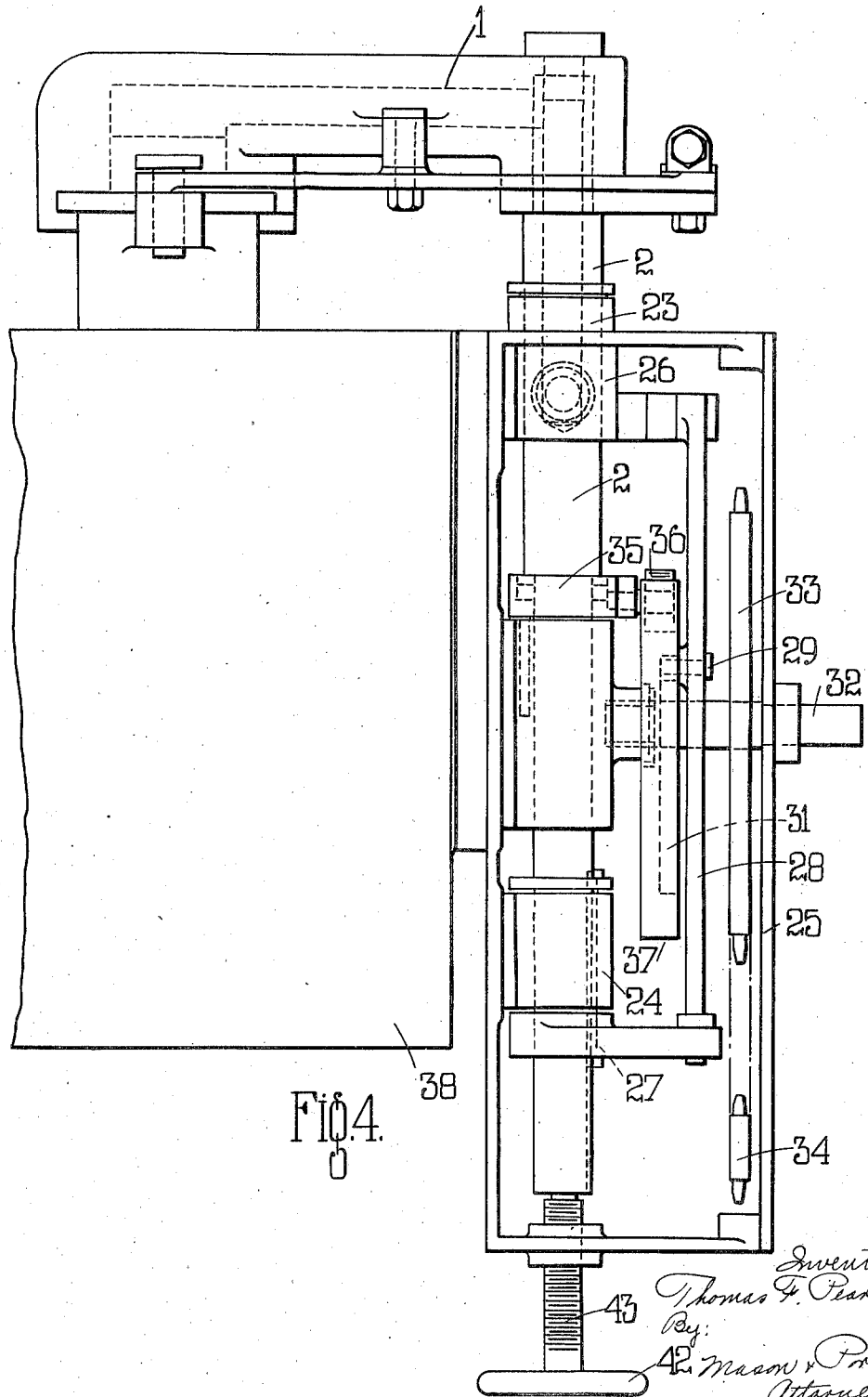
Figure 4 shows the gathering head in position over the boot of the furnace or tank.
Figure 5:
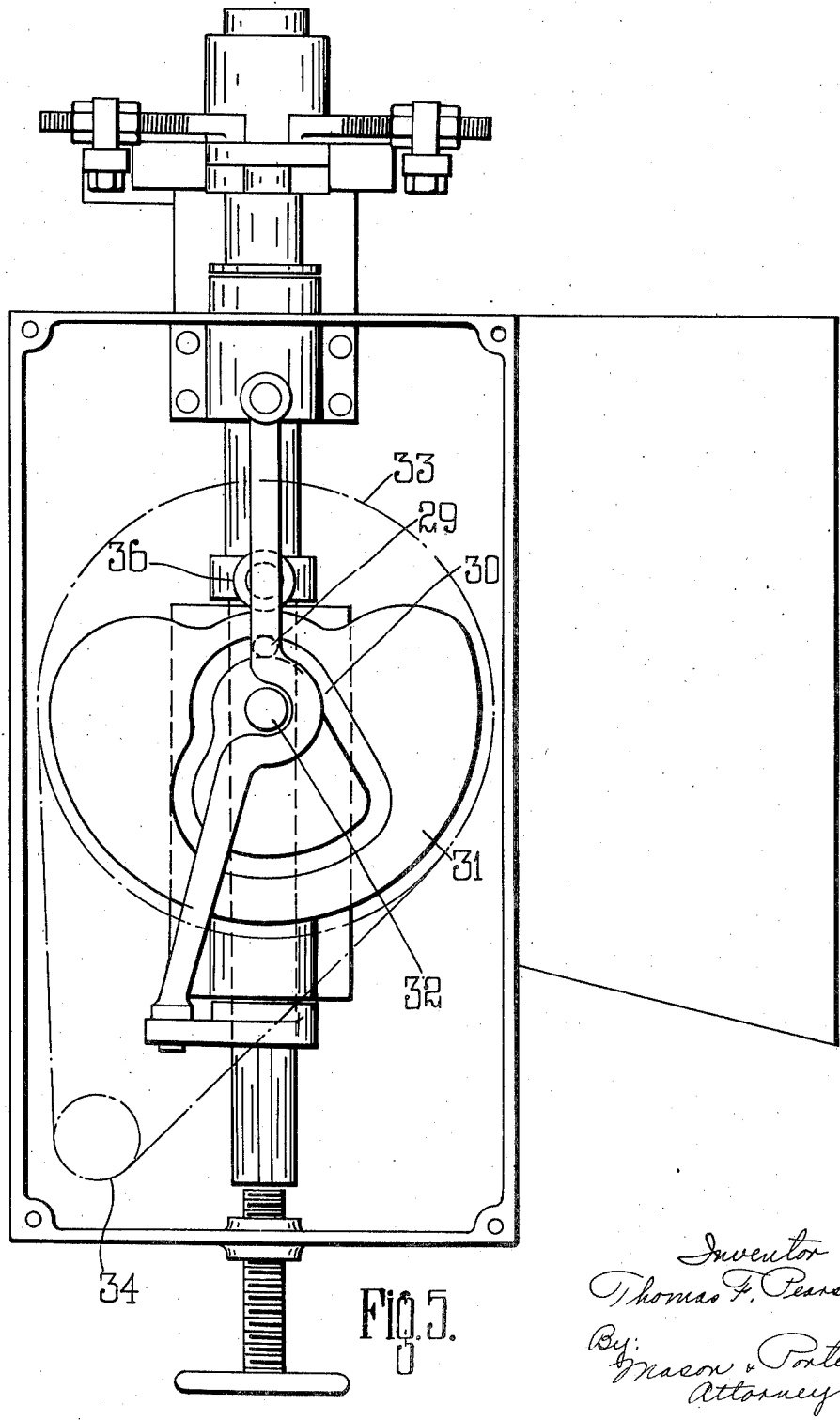
Figure 5 is a corresponding front view.
Figure 6:
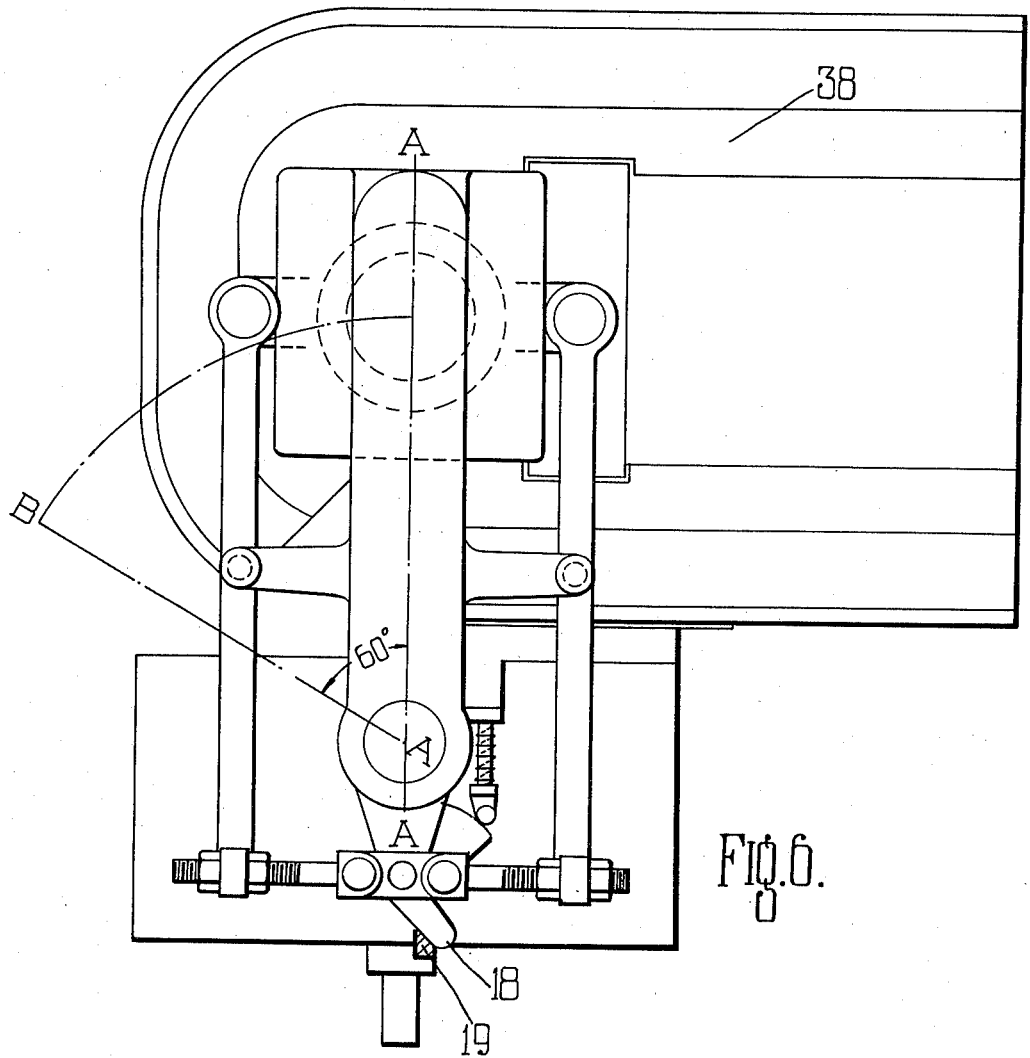
Figure 6 is a corresponding plan view, similar to Figure 3 but showing a slightly modified form of mold opening and closing means.

Further rotation of the cam groove 30 will swing the gathering head 1 back into the position shown in Figure 4, the mould sections closing as soon as the finger 20 has passed again the roller 21, and as soon as the gathering head comes to lie in the position shown on Figures 4 and 6 the roller 36 will come into the depressions of the face cam 31 to depress the gathering head on to the surface of glass in the boot end of the furnace to pick up a charge therefrom. Any desired shearing means may be used to shear off any string of glass from the surface of the glass in the tank end 38 to the suction opening 41 presented by the mould sections 4, 5.

A hand wheel 42 on a threaded spindle 43 is provided for adjusting the limits of reciprocation axially of the spindle.

Instead of oscillating a single gathering head about a vertical spindle say through 60°, a number of gathering heads may be arranged radiating from and rotating about a central axis to come over the furnace, and then over a parison mould in turn.

The invention sought to be protected in the present application relates to the suction gatherer, and to the means for oscillating and reciprocating the gathering head. The novel mold opening and closing means disclosed in this application and the specific structure of the tri-partite mold are the subject matter of my co-pending case Serial No. 16,920, filed April 17, 1935.

I declare that what I claim is:

1. A suction gatherer comprising a hollow horizontal arm, a suction gathering head at one end thereof and a vertically disposed supporting spindle at the other, and means for imparting limiting reciprocatory and oscillatory movements to said spindle to lower and raise said head into and out of the class in a forehearth and to swing said head laterally to a discharge position, said means comprising a rotating disc having a peripheral cam surface, a roller projecting laterally from the spindle and supported on said surface to derive movement from the rotation of said disc, thereby to reciprocate the spindle vertically, and a crank mechanism operatively connected to and driven by said disc for oscillating the spindle in timed relation to the reciprocation thereof.

2. A suction gatherer comprising a vertically disposed spindle, a horizontal arm carried by the upper end thereof, a gathering head carried by said arm, and means for imparting reciprocatory and oscillatory movements to said spindle, said means comprising a roller on said spindle, a laterally projecting arm on said spindle at a point spaced from the roller, a crank connected to the outer end of said arm, a constantly rotating cam having a portion in engagement with said roller to reciprocate said spindle and having another portion in engagement with said crank to actuate the latter and oscillate the spindle.

3. A suction gatherer as specified in claim 2 comprising adjustable means distinct from said cam for determining the lower limit of the reciprocating movement of the spindle to compensate for changes in the glass level.

4. A suction gatherer comprising a vertically disposed spindle, a horizontal arm in the upper end thereof, and a gathering head carried thereby, and means for raising and lowering and for oscillating said spindle, said means comprising a collar on said spindle, a roller carried by the collar, a laterally projecting arm splined on the spindle adjacent the lower end thereof, a crank connected to said arm and a single cam element for oscillating said crank and for raising and lowering said collar.

5. A suction gatherer comprising a hollow horizontal arm, a suction gathering head at one end thereof and a vertically disposed spindle at the other, said head comprising relatively movable mould sections of predetermined shape and including air ducts communicating with said hollow arm, means for applying suction to said head through said arm and said ducts, and means for imparting limited reciprocatory and oscillatory movements to said spindle to lower and raise said head into and out of the glass in a forehearth and to swing said head laterally to a discharge position, said means comprising a pair of cams rotating in unison about a single axis, a follower for each cam and an independent connection between each of said followers and said spindle, one adapted to effect the reciprocatory movements and the other the oscillatory movements.

6. A suction gatherer comprising a hollow horizontal arm, a suction gathering head at one end thereof and a vertically disposed spindle at the other, said head comprising relatively movable mould sections of predetermined shape and including air ducts communicating with said hollow arm, means for applying suction to said head through said arm and said ducts, and means for imparting limited reciprocatory and oscillatory movements to said spindle to lower and raise said head into and out of the glass in a forehearth and to swing said head laterally to a discharge position, said means comprising a pair of cams rotating in unison about the same axes, a follower in engagement with each cam, and an independent connection between each of said followers and the spindle, one of said connections comprising means for supporting the spindle and serving to impart reciprocatory movement thereto and the other connection comprising a crank interposed between one follower and the spindle and serving to impart oscillatory movements to said spindle.

7. A suction gatherer comprising a hollow horizontal arm, a suction gathering head at one end thereof and a vertically disposed spindle at the other, said head comprising relatively movable mould sections of predetermined shape and including air ducts communicating with said hollow arm, means for applying suction to said head through said arm and said ducts, and means for imparting limited reciprocatory and oscillatory movements to said spindle to lower and raise said head into and out of the glass in a forehearth and to swing said head laterally to a discharge position, said means comprising a constantly rotating disc having a pair of independent cam surfaces associated therewith, and independent connections between the respective cam surfaces and the spindle, one of said connections comprising a roller projecting laterally from and serving to support the spindle and the other comprising a crank connected to the spindle to oscillate the same.

THOS. FINNEY PEARSON.